United States Patent
Memon (10) Patent No.: US 12,117,419 B2
(45) Date of Patent: Oct. 15, 2024

(54) METHOD FOR DETECTING INTERNAL COATING DEFECTS IN PIPE SAMPLE

(71) Applicant: KING FAHD UNIVERSITY OF PETROLEUM AND MINERALS, Dhahran (SA)

(72) Inventor: Azhar Mehmood Memon, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 280 days.

(21) Appl. No.: 17/949,564

(22) Filed: Sep. 21, 2022

(65) Prior Publication Data

US 2024/0094168 A1    Mar. 21, 2024

(51) Int. Cl.
G01N 29/24    (2006.01)
G01N 29/11    (2006.01)

(52) U.S. Cl.
CPC ......... *G01N 29/2412* (2013.01); *G01N 29/11* (2013.01); *G01N 2291/2636* (2013.01)

(58) Field of Classification Search
CPC ............... G01N 29/2412; G01N 29/11; G01N 2291/2636; G01N 29/041; G01N 29/043; G01N 29/348; G01N 29/46
See application file for complete search history.

(56) References Cited

U.S. PATENT DOCUMENTS 4,092,868 A * 6/1978 Thompson ......... G01N 29/2412
                                                    73/638
4,296,486 A * 10/1981 Vasile .................... H04R 9/047
                                                    367/140
4,691,572 A * 9/1987 van den Berg .... G01N 29/2412
                                                    73/622

(Continued)

FOREIGN PATENT DOCUMENTS

JP    2019-86487 A    6/2019

OTHER PUBLICATIONS

Zhang, et al. ; Radio Frequency Non-destructive Testing and Evaluation of Defects under Insulation ; Newcastle University, School of Electrical and Electronic Engineering ; Jun. 2014 ; 177 Pages.

(Continued)

*Primary Examiner* — Francis C Gray
(74) *Attorney, Agent, or Firm* — Oblon, McClelland, Maier & Neustadt, L.L.P.

(57) ABSTRACT

A method for detecting internal coating defects in a pipe sample with an electromagnetic acoustic transducer sensor. The method includes recording a plurality of Lamb mode scans of the pipe sample with the EMAT sensor, where each Lamb mode scan is measured along a length of the pipe sample in axial alignment with the pipe sample; and processing the Lamb mode scans by applying a singular spectrum analysis to the Lamb mode scans to generate data from which the internal coating defects in the pipe sample are identified. The Lamb mode scans are at a frequency from (Continued)

dispersion curve of from 0.3 to 2 MHz, at a frequency of from 0.4 MHz to 2 MHz, a group velocity of from 1 mm/µs to 3 mm/µs, a phase velocity of from 5 mm/µs to 25 mm/µs, and a wave count of from 3 to 10.

20 Claims, 8 Drawing Sheets

(56) References Cited

U.S. PATENT DOCUMENTS

| | | | | |
|---|---|---|---|---|
| 5,619,423 A * | 4/1997 | Scrantz | ............. | G01N 29/4463 324/229 |
| 5,907,100 A * | 5/1999 | Cook | ................ | G01N 29/2412 73/622 |
| 5,965,818 A * | 10/1999 | Wang | .................... | G01N 29/07 73/598 |
| 6,164,137 A * | 12/2000 | Hancock | ............ | G01N 29/2412 73/598 |
| 6,920,792 B2 * | 7/2005 | Flora | .................. | G01N 29/2412 73/622 |
| 7,663,969 B2 * | 2/2010 | Tang | ..................... | E21B 47/005 181/105 |
| 9,347,851 B2 * | 5/2016 | Hart, Jr. | ............... | G01N 29/069 |
| 2017/0176393 A1 | 6/2017 | O'Donnell et al. | | |
| 2019/0227037 A1 | 7/2019 | Maxfield et al. | | |

OTHER PUBLICATIONS

Lee, et al. ; Use of EMAT for Monitoring Pipe Support Corrosion Detected by an Internal PIG ; 15th Asia Pacific Conference for Non-Destructive Testing ; 2017 ; 8 Pages.

* cited by examiner

METHOD FOR DETECTING INTERNAL COATING DEFECTS IN PIPE SAMPLE

STATEMENT REGARDING PRIOR DISCLOSURE BY AN INVENTOR

Aspects of the present disclosure are described in Azhar M. Memon, "On Detecting Internal Coating Defects in Pipes using EMAT" published in NDT-CE-2022 on Aug. 17, 2022, which is incorporated by reference herein in its entirety.

STATEMENT OF ACKNOWLEDGEMENT

The inventor acknowledges the support provided by the King Fahd University of Petroleum & Minerals (KFUPM), Riyadh, Saudi Arabia through Project SR191004

BACKGROUND

Technical Field

The present disclosure relates to devices of and methods for nondestructive testing and evaluation and more particularly relates to methods for detecting internal coating defects in a pipe sample using electromagnetic acoustic transducers.

Discussion of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Integrity of a pipeline ensures safe and smooth operation. As such, periodic inspections may be required to make timely decisions for replacement or repair of the pipeline. A common challenge encountered in a pipeline network is detection of defects in an internal coating thereof, whereby it is required to locate and characterize damage to the internal coating of the pipeline. In order to address such internal defects or damages, often an entire set of a pipeline or a large segment thereof is replaced due to an unknown defect location, creating significant wastage and added costs.

Non-destructive testing (NDT) is well known in the oil and gas service sector, which is able to detect internal defects or damages without requiring decommissioning or dismantling of the pipeline. NDT and nondestructive evaluation (NDE) are widely used to locate material anomalies, some of which may be detrimental to the safety and/or effective performance of bodies, assemblies, and subsystems employing the pipeline containing such material anomalies. Within the broad range of methods and techniques that are employed in NDT/NDE, a particular class of ultrasonic transducers called electromagnetic acoustic transducers (EMATs) frequently exhibit very useful and practical characteristics not available through the use of other types of ultrasonic transduction mechanisms. EMATs may be used to detect and characterize material anomalies, such as cracks, pits, and the like, when a test object is at a significantly elevated temperature or moving at a high speed with respect to NDT/NDE system.

EMATs have several advantages for generating elastic displacements within a test object. These advantages include the ability to perform in the total absence of any physical medium between either the transmitting or receiving conductor sets and the test object. From these advantages flows the ability to use properly designed EMATs at elevated temperatures and at high relative speed between the EMAT assembly and the test object surface. EMATs are also more tolerant with respect to the cleanliness of the test object surface, which is a rigid requirement for traditional, non-EMAT ultrasonic NDT/NDE methods. Ultrasound waves generated by transient thermoelastic forces such as laser pulses do not always require very clean surfaces, however thermoelastic forces may depend strongly on surface conditions. Ultrasound generated by air coupled transducers may not require very clean surfaces. However, air coupled transducers have several limitations related to sensitivity and deployment factors.

An industrial example where the internal defects or damages may be found includes a concrete-filled steel pipeline, used to provide civil structural reinforcement, which is often subjected to internal corrosion due to a corrosive environment which causes delamination between the concrete and steel materials of the pipeline, and the same was investigated using EMAT-generated Lamb waves [See: W B Na and T Kundu, 'EMAT-based inspection of concrete-filled steel pipes for internal voids and inclusions', J. Pressure Vessel Technol., Vol. 124, No. 3, pp. 265-272, 2002]. Signal amplitude and wavelet transforms were used to distinguish between various lengths of voids and inclusions, in addition to their position relative to EMATs [See: W B Na, T Kundu, Y S Ryu and J T Kim, 'Concrete filled steel pipe inspection using electromagnetic acoustic transducer (EMAT)', Smart Structures and Materials 2005: Sensors and Smart Structures Technologies for Civil, Mechanical, and Aerospace Systems, Vol. 5765, International Society for Optics and Photonics, pp. 74-84, 2005]. For low-density cement, acoustic impedance and the corresponding tool response were essentially the same as that from a fluid in contact with the pipeline, thus hindering detection of interfacing material. To investigate this problem, EMAT-generated shear horizontal (SH) wave modes were used [See: D Patterson, A Bolshakov and P J Matuszyk, 'Utilization of electromagnetic acoustic transducers in downhole cement evaluation', SPWLA 56th Annual Logging Symposium, July 2015] and it was reported that SH0 mode showed lesser attenuation (in dB per unit length of the pipeline) compared with SH1. This formed a basis of detection feature. In addition, the detection of microcannulas was also shown feasible with Lamb wave A0 mode.

US20170176393A1 describes a method of detecting material changes in a composite structure, where a pulsed laser beam is directed towards a composite structure comprised of a number of composite materials. Wide-band ultrasonic signals are formed in the composite structure when radiation of the pulsed laser beam is absorbed by the composite structure. The wide-band ultrasonic signals are detected to form data. The data includes a number of ultrasonic A-scans. The data is processed to identify a plurality of frequency measurements for each of the number of ultrasonic A-scans, where a frequency image is displayed using the plurality of frequency measurements.

Aforementioned references suffer from one or more drawbacks hindering their adoption. Accordingly, it is one object of the present disclosure to provide methods for detecting internal coating defects in the pipelines using commercially available hand-held EMAT devices.

SUMMARY

According to one aspect of the present disclosure, a method for detecting internal coating defects in a pipe sample with an electromagnetic acoustic transducer (EMAT) sensor is provided. The method includes recording a plurality of Lamb mode scans of the pipe sample with the EMAT sensor, where each Lamb mode scan of the plurality of Lamb mode scans is measured along a length of the pipe sample in axial alignment with the pipe sample; and processing the plurality of Lamb mode scans by applying a singular spectrum analysis (SSA) to the plurality of Lamb mode scans to generate data from which the internal coating defects in the pipe sample are identified. The plurality of Lamb mode scans are at a frequency from dispersion curve of from 0.3 to 2 MHz, at a frequency of from 0.4 MHz to 2 MHz, a group velocity of from 1 mm/μs to 3 mm/μs, a phase velocity of from 5 mm/μs to 25 mm/μs, and a wave count of from 3 to 10.

In some embodiments, the method further comprises helically wrapping an internal surface of the pipe sample with a butyl tape-wrap, such that edges of the butyl tape-wrap touch and cover the entire internal surface of the pipe sample. The method further includes adhering the butyl tape-wrap to the pipe sample with an adhesive.

In some embodiments, wherein at least 40 Lamb mode scans are recorded axially along the length of the pipe sample.

In some embodiments, the plurality of Lamb mode scans includes A-scans and B-scans. In some embodiments, the method further includes combining the A-scans and the B-scans to generate C-scan data to analyze defect information.

In some embodiments, the method further includes taking a second plurality of Lamb scans with a frequency from dispersion curve of from 0.15 to 1.5 MHz, at a frequency of from 0.1 MHz to 1.5 MHz, a group velocity of from 3 mm/μs to 5 mm/μs, a phase velocity of from 2.5 mm/μs to 15 mm/μs, and a wave count of from 3 to 10.

In some embodiments, the method further includes taking a third plurality of Lamb scans with a frequency from dispersion curve of from 0.35 to 2.25 MHz, at a frequency of from 0.4 MHz to 2 MHz, a group velocity of from 4.5 mm/μs to 7 mm/μs, a phase velocity of from 5.5 mm/μs to 15 mm/μs, and a wave count of from 3 to 10.

In some embodiments, the method further includes taking a fourth plurality of Lamb scans with a frequency from dispersion curve of from 0.2 to 1.5 MHz, at a frequency of from 0.2 MHz to 1.5 MHz, a group velocity of from 3 mm/μs to 5 mm/μs, a phase velocity of from 2.5 mm/μs to 15 mm/μs, and a wave count of from 3 to 10.

In some embodiments, the recording of the plurality of Lamb mode scans occurs from 60% to 80% of the length of the pipe sample.

In some embodiments, the singular spectrum analysis (SSA) includes applying singular value decomposition (SVD) to the trajectory matrix for decomposition to produce component matrices; combining the component matrices, which are a product of eigenvectors and respective singular values, to group related, similar, or predetermined periodicities or patterns in the signal; and reconstructing a singular component's time series from an individual component matrix; and carrying out the SSA on the pipe sample.

In some embodiments, the method further includes defining an energy parameter A as a function of a total count of A-scan samples.

In some embodiments, the method further includes defining an energy parameter B as a function of a total count of A-scans in each B-scan.

In some embodiments, the method further includes defining an energy parameter C as a function of a total count of B-scans taken.

In some embodiments, the method further includes calculating an energy value for each A-scan, defined as a function of the energy parameter A, the energy parameter B, and the energy parameter C.

In some embodiments, the method further includes plotting a contour map for an entire circumference of the pipe sample as a function of the energy value.

In some embodiments, the pipe sample is patched based on defects identified by the contour map.

In some embodiments, the defects of the pipe sample are marked based on defects identified by the contour map.

In some embodiments, the method further comprises fixing the pipe sample based on the generated data from which the internal coating defects are identified in the pipe sample. In some embodiments, the method further comprises marking the pipe sample into sections along the length of the pipe sample.

In some embodiments, the method further comprises selecting a frequency at a particular mode such that a neighboring mode is not excited, thus avoiding interference of wave bursts.

These and other aspects of non-limiting embodiments of the present disclosure will become apparent to those skilled in the art upon review of the following description of specific non-limiting embodiments of the disclosure in conjunction with the accompanying drawings.

BRIEF DESCRIPTION OF THE DRAWINGS

A better understanding of embodiments of the present disclosure (including alternatives and/or variations thereof) may be obtained with reference to the detailed description of the embodiments along with the following drawings, in which.

DETAILED DESCRIPTION

In the following description, it is understood that other embodiments may be utilized, and structural and operational changes may be made without departure from the scope of the present embodiments disclosed herein.

Reference will now be made in detail to specific embodiments or features, examples of which are illustrated in the accompanying drawings. Wherever possible, corresponding, or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Ultrasonic NDT/NDE encompasses many widely practiced and refined methods for measuring and quantifying many engineering aspects of a test object including its material properties, material anomalies, and defect structure. According to an one embodiment, there are two basic classes of EMATs: the first is based upon the Lorentz force acting on induced currents in metals and the second is based upon magnetostriction. Although some embodiments in this disclosure focus specifically upon Lorentz force EMATs (LF EMATs), those skilled in the art may recognize that these embodiments may also relate to magnetostriction EMATs (MS EMATs). Therefore, as used herein, the embodiments related to LF EMATs also apply to MS EMATs. LF EMAT involves certain EMATs where the magnetic field responsible for generating the Lorentz force on the induced currents is the self-field generated by the current within the transmitting EMAT conductor set. Additionally, some embodiments that make specific reference to the use of EMATs may also be understood as relating to the use of generating elastic, ultrasonic waves by whatever means. Therefore, as used herein, elastic waves and ultrasonic waves are to be used interchangeably. As used herein, conductor sets, coils, and wire coils are sometimes used interchangeably with conductor sets being less restrictive than coils which are a specific type of conductor set. As used herein, permanent magnets may be replaced by electromagnets, including pulsed electromagnets, or a combination of permanent magnets and electromagnets. As used herein, NDT/NDE refers to all measurement and inspection tasks using elastic waves such as measuring or monitoring various material characteristics and properties. As used herein, Lamb waves and Lamb-like waves are used interchangeably. As used herein, guided waves encompass several classes of wave modes that are less restrictive than Lamb waves.

Figure 1:
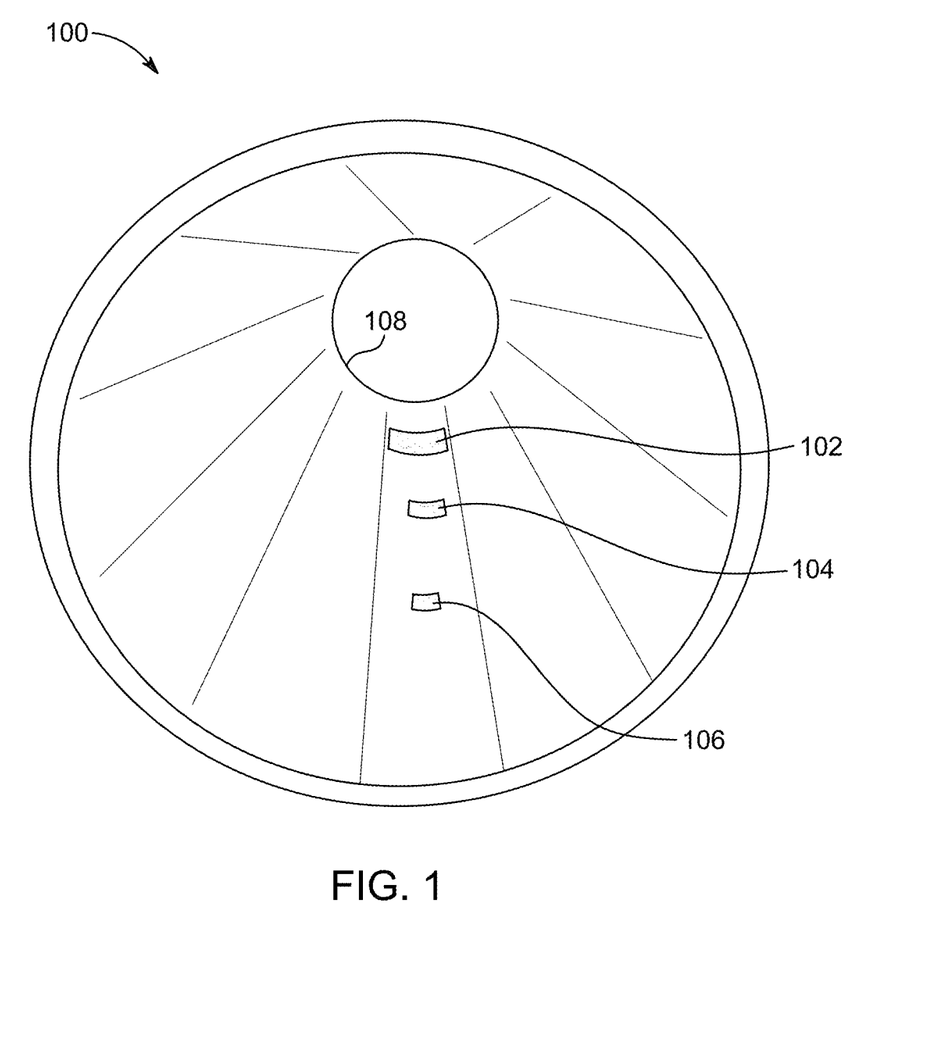
FIG. 1 illustrates a pipe sample having both ends open, according to an aspect of the present disclosure.
Figure 6:
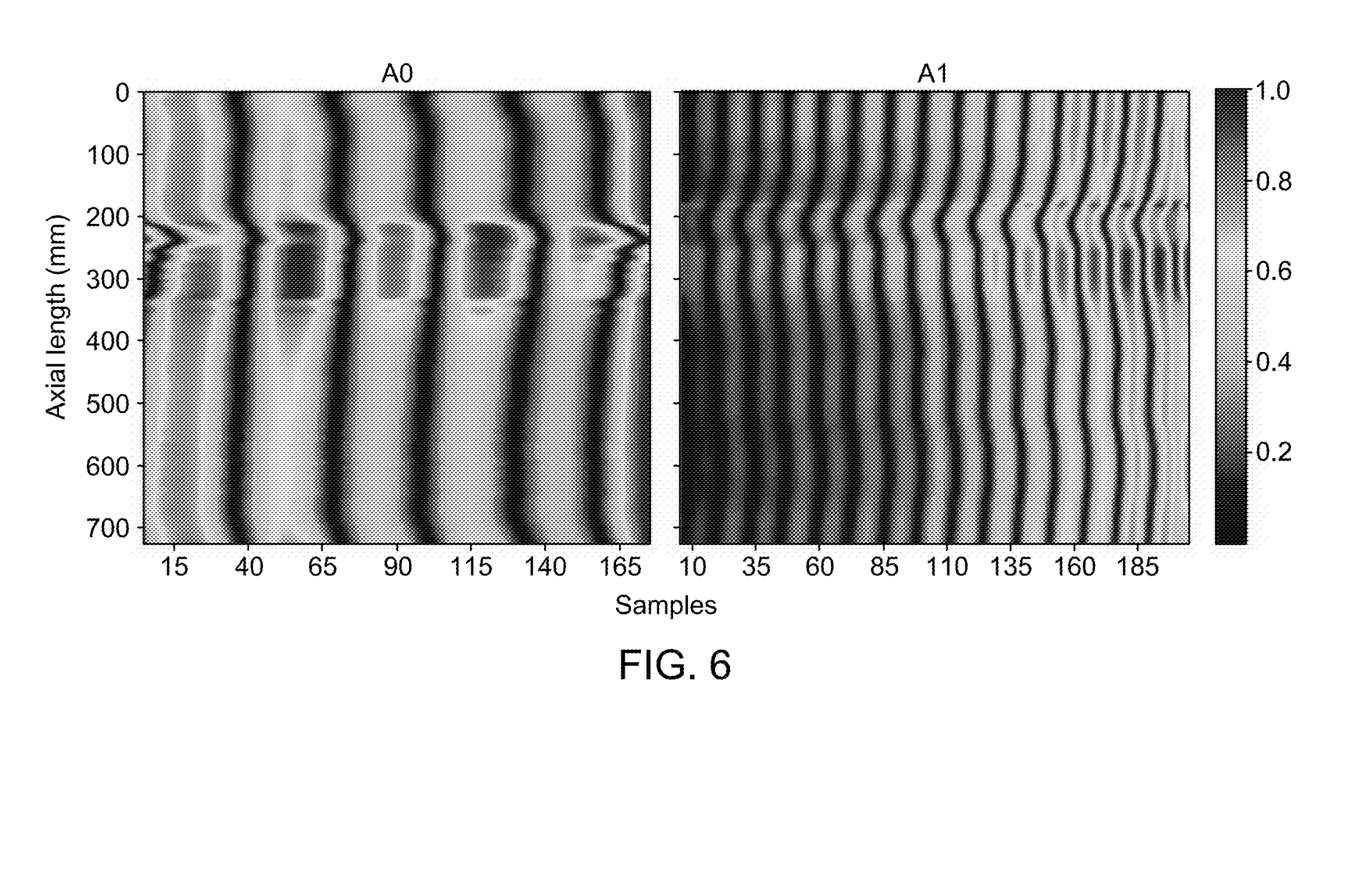
FIG. 6 illustrates a two dimensional (2D) graph depicting second component of A0 mode and a combined graph of first and second components of the A1 mode, according to an aspect of the present disclosure.

FIG. 1 illustrates a pipe sample 100 having both ends open. Particularly, FIG. 1 illustrates a view of the pipe sample 100 as seen from one end thereof. In an embodiment, an internal surface of the pipe sample 100 is coated with tape-wrap. In an aspect, a hot air blower may be used to ensure adhesion of the tape-wrap to the internal surface of the pipe sample 100. In an embodiment, the tape-wrap on the internal surface of the pipe sample 100 may be applied to the pipe sample 100 in a laboratory or may be performed as per industrial standards. In alternate embodiments, the pipe sample 100 is coated with a metal foil, plastic, or the like. In an embodiment, the tape-wrap is a mixture of at least one of propylene and polyethylene. In an embodiment, the tape-wrap is a butyl trape-wrap such as denso-butyl 30 tape, denso-butyl 35 tape, tapecoat 200, tapecoat H50, tapecoat H35, tapecoat M50 RC, tapecoat T-tape, or tapecoat TR green. In an embodiment, the tape-wrap incudes an adhesive to help bind to the internal surface of the pipe sample 100. In an embodiment, the tape-wrap is applied in one layer over the pipe sample 100. In an embodiment, the tape-wrap is applied in more than one layer over the pipe sample 100. Preferably the tape wrap is wrapped in a helical fashion such that the edges of touch and cover the entire inner surface of the pipe sample 100 being analyzed but the edges of the tape wrap do not overlap. In some embodiments, the method further comprises helically wrapping an internal surface of the pipe sample 100 with a butyl tape-wrap. In some embodiments, the butyl tape-wrap wherein each layer of the butyl tape-wrap is adjacent to a prior layer of butyl tape-wrap. In some embodiments, the tape-wrap has a reflective coating. In some embodiments, the reflective coating is that of silver, gold, aluminum, magnesium fluoride, zinc sulfide, titanium dioxide, silicon dioxide, or the like. The reflective material in the tape wrap is preset to localize the EMAT signal to a specific section of the pipe sample 100, so that the EMAT signal is not polluted with extraneous background noise. As depicted in FIG. 6, the right-most graph, it is hard to detect the defect with the amount of extraneous noise and interference. However, when a reflective coating is added, depicted in FIG. 6 in the left-most graph, the square-like patches can be detected better from the EMAT signals. Thus, with the addition of the reflective coating in the tape-wrap, it is possible to get greater clarity of the defect from the EMAT signals produced. The method further includes adhering the butyl tape-wrap to the pipe sample with an adhesive. In some embodiments, the adhesive is a rubber adhesive, acrylic adhesive, or a silicone adhesive. The adhesive ensures the tape-wrap sticks to the pipe sample 100 and does not loosen up during operation.

In an embodiment, the pipe sample 100 is made of carbon steel and has a length of 1 meter (m), a diameter of 12 inches (in), a wall thickness of 10 millimeters (mm). In an embodiment, the length of the pipe sample 100 ranges from 1 m to 20 m, preferably from 2 m to 18 m, preferably from 4 m to 16 m, preferably to 6 m and 14 m, preferably from 8 m to 12 m, or 10 m. In an embodiment, the diameter of the pipe sample 100 ranges from 12 in to 108 in, preferably from 24 in to 96 in, preferably from 36 in to 84 in, preferably from 48 to 72 in, or 60 inches. In an embodiment, the wall thickness of the pipe sample 100 ranges from 10 mm to 200 mm, preferably from 20 mm to 180 mm, preferably from 40 m to 160 mm, preferably from 60 mm to 140 mm, preferably from 80 mm to 120 mm, or 100 mm. The pipe sample 100 may suffer one or more of three coating defects (for example, patches), encompassed in a coating area. In an embodiment, the coating defect can be encompassed by a square shape, where the centers of a first patch 102, a second patch 104, and a third patch 106 encompassed in each square are axially aligned with respect to a longitudinal axis of the pipe sample 100. In some embodiments, the patches are rectangular in shape, triangular, pentagonal, hexagonal, octagonal, or otherwise polygonal. In some embodiments, the patches are irregularly shaped. In an aspect, 100% coating is removed from each of the patches to form a first patch 102, a second patch 104, and a third patch 106. That is, when the coating is removed from each of the first patch 102, the second patch 104, and the third patch 106, the bare pipe of the pipe sample 100 is exposed within each area of each patch. The bare pipe of the pipe sample 100 is then able to be scanned for pipe defects without the coating present. Dimensions of the first patch are 102 is 10×10 mm$^2$, that of the second patch 104 are 30×30 mm$^2$, and that of the third patch 106 are 100×100 mm$^2$. In an embodiment, the first patch 102 is located at a distance of about 230 mm from an end 108 of the pipe sample 100, the second patch 104 is located at a distance of 520 mm from the end 108, and the third patch 106 is located at a distance of 650 mm from the end 108. In essence, the tape-wrap mimics a coating process for the pipe sample 100, and as such, the patches are a mimic for a defect in the pipe sample 100.

According to an embodiment, an EMAT system is divided into two parts: the first part of the EMAT system, the transmitting section, is responsible for generating one or specific elastic wave modes in a test object (hereinafter referred to as T EMAT) and the second part of the EMAT system, the receiving section, is responsible for converting elastic wave mode displacements into an electrical voltage that is processed by the EMAT receiving system instrumentation and software (hereinafter referred to as R EMAT). One skilled in the art may recognize that the T EMATs and R EMATs preferably serve distinct and separate functions and, as such, improving the overall performance of an EMAT system generally benefits from special separate considerations to each of these sections. In some embodiments, these separate considerations may apply to both LF and MS EMATs, considering that the separate functions of T and R EMATs may be particularly important in cases where the Lorentz force is responsible for generating elastic displacements. In some embodiments, the same permanent magnet and conductor set configuration for both T and R EMAT may be utilized in one EMAT system. In some embodiments, separate T and R conductor sets may be placed under the same magnet.

According to an embodiment, one major factor in determining the overall sensitivity of an EMAT sensor is the magnitude of the magnetic field experienced by: (i) currents induced in the metal surface of the test object at which elastic waves are generated by the T EMAT conductor set or (ii) the lattice displacements that are responsible for generating the external electromagnetic fields that are sensed by the R EMAT conductor set. Depending on the interplay between the magnetic field distribution and EMAT conductor set configuration, various types of elastic wave modes may be generated and their purity (i.e., the degree to which the actual displacements coincide with those predicted theoretically or calculated numerically) may be altered. In some embodiments, when conducting NDT/NDE, it is desirable to control the elastic wave mode that is generated as well as the mode purity. The mode purity relates to how closely the generated elastic wave mode approximates the ideal, calculated mode that one seeks to generate in order to accomplish the specific NDT/NDE objective. In evaluating the effectiveness of various EMAT designs, it is to be understood that the magnetic field in and near the EMAT active regions depends upon the dimensions of the permanent magnet (predominantly on the dimension in the direction of magnetization divided by some combination of the lateral dimensions) as well as upon the specific magnetic properties of the permanent magnet, its overall magnetic circuit, and on the magnetic properties of the test object.

According to one embodiment, an EMAT conductor set, either for generating or receiving elastic waves, may include an active region. An active region in the sample is where induced currents or the electromagnetic fields resulting from elastic displacements are preferentially allowed access to a portion of the test object surface or the R EMAT conductor set so as to generate or receive a beam of elastic waves having features that would not exist were it not for the deployment of special materials to create or define the active region. At the same time, some portions of the test object may be completely or partially shielded from induced currents to generate or receive elastic waves having the most desirable features. The magnetic field may be preferentially focused by the use of a pole cap to aid in the generation of an elastic wave beam that most closely approximates the ideal or desired beam. For example, an active region is a region of the T EMAT conductor set where the currents induced in the test object are solely or primarily responsible for generating the desired elastic wave mode. On the other hand, an active region is the region of the R EMAT conductor set where the desired elastic wave modes dominate in the generation of an external electromagnetic field whose presence is measured by the R EMAT conductor set. In some embodiments, the external electromagnetic fields are present regardless of the presence of conducting material in the vicinity of the R EMAT conductor set. The degree of shielding may determine what portions of the external electromagnetic fields result in a voltage being generated in the R EMAT conductor set.

According to an embodiment, the amplitude of the generated elastic wave mode by the T EMAT may be defined by altering the magnitude of the T EMAT current induced in the test object by the T EMAT conductor set. In other embodiments, the amplitude may be improved by altering the magnetic field experienced by the induced current within the active region of the T EMAT conductor set. In some embodiments, conducting material, magnetic focusing methods, and/or magnetic concentrating methods (such as using a pole cap or a flux trap) are used to maximize the Lorentz force within the active region of the conductor set and, conversely, to minimize the Lorentz force and hence unwanted elastic displacements outside the active region. In some embodiments, various magnet and conductor set configurations are used to generate one or more elastic wave modes within the test object. In an embodiment, the magnet and conductor are disposed perpendicular to one another in the T EMAT. In an embodiment, the magnet and conductor are disposed parallel to one another in the T EMAT. In an embodiment, the conductor set has an amount of current ranging from 1 kiloamp (kA) to 10 kA, preferably from 2 kA to 9 kA, preferably from 3 kA to 8 kA, preferably from 4 kA to 7 kA, or 5 kA. In an embodiment, the magnet has a shielding of a metal screen, a metal foam, or a metal sheet, wherein the metal sheet is copper, brass, nickel, silver, steel, or tin. The conductor set may include conducting material having various widths and thicknesses, each of which may vary as needed throughout the conductor set. In an embodiment, the conducting material is a metal, metal foam, graphite, graphene, or a metal foam. In an embodiment, the conducting material width is of from 10 mm to 50 mm, preferably from 15 mm to 45 mm, preferably from 20 mm to 40 mm, preferably 25 mm to 35 mm, or 30 mm. In an embodiment, the thickness of the conducting material is of from 2 mm to 20 mm, preferably from 4 mm to 18 mm, preferably from 6 mm to 16 mm, preferably from 8 mm to 14 mm, preferably from 10 mm to 12 mm, or 11 mm. In some embodiments, the T EMAT conductor set and the R EMAT conductor set may be substantially similar. In other embodiments, the T EMAT conductor set and the R EMAT conductor set are different. For example, the T EMAT conductor set and the R EMAT conductor set vary in their conductivity based upon the thickness or width of conducting material present and the type of conducting material employed. Further, the T EMAT conductor set and the R EMAT conductor set also vary in their porosity based upon the thickness or width of conducting material present and the type of conducting material employed.

According to an embodiment, the magnitude of the electrical signal produced by the R EMAT is governed by several factors such as the magnetic field that exists within the active region of the R EMAT conductor set and the length of the conductor within the active region of this conductor set. The performance of R EMATs may be improved by providing a larger magnetic field within the active region of the R EMAT conductor set and creating conditions where it is relatively easy to minimize image fields generated by elastic wave displacements at or near the test object surface where the R EMAT conductor set is positioned, such that image fields can be generated in nearby conducting material such as the magnet and any supporting metal framework. In some embodiments, a longer R EMAT conductor set is used which may result in a larger voltage output from the R EMAT conductor set.

According to an embodiment, various like-pole magnet structure (LPMS) EMAT configurations are suitable for use in resonant EMAT measurement systems based on the use of guided or bulk shear horizontal (SH) waves and other wave modes suitable for use in resonant EMAT applications. LPMS can be defined as a class of EMATs where the magnetic poles face each other. In some embodiments, various LPMS EMAT configurations generate SH waves over a very wide area using relatively small magnets. In some embodiments, various LPMS EMAT configurations are suitable for concentrating or projecting SH energy for detection of material anomalies or determining material properties in difficult-to-reach regions or at points distant to the SH LPMS.

According to an embodiment, LPMS EMAT configurations may have various spacing distances between the magnet faces. In some embodiments, widths (or other dimensions) of each magnet may also vary throughout the LPMS. In some embodiments, the width of each magnet may range from 10 mm to 50 mm, preferably from 20 mm to 40 mm, or 30 mm. In some embodiments, a change in magnet arrangement may result in an alternate beam shape, which may be useful for generating various SH waves and other bulk and guided waves.

Figure 2:
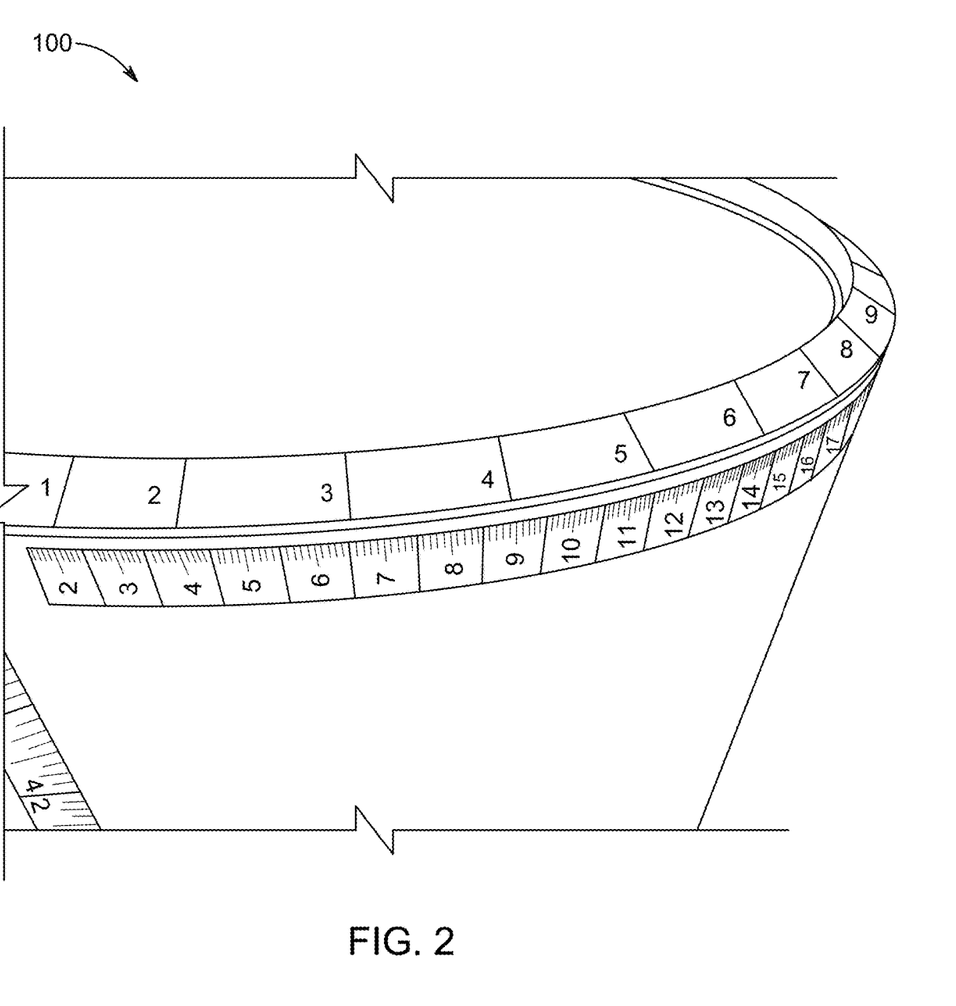
FIG. 2 illustrates a perspective view of a portion of the pipe sample, according to an aspect of the present disclosure.

FIG. 2 illustrates a perspective view of a portion of the pipe sample 100. In an embodiment, the pipe sample 100 may be marked with B-scan positions, where the circumference of the pipe sample measured at the outer surface thereof may be divided into, for example, 40 sections along the length of the pipe sample. Each section is a circumferential section spaced 25 mm along the length of the pipe sample, as shown in FIG. 2. In some embodiments, the pipe sample 100 can be marked into from 20 to 200 sections, preferably from 40 to 180 sections, preferably from 60 to 160 sections, preferably from 80 to 140 sections, preferably from 100 to 120 sections, or 110 sections. In some embodiments, the sections of the pipe sample 100 may be spaced apart from 10 mm to 200 mm, preferably from 20 mm to 180 mm, preferably from 40 mm to 160 mm, preferably from 60 mm to 140 mm, preferably from 80 mm to 120 mm, or 100 mm.

In some embodiments, a recording a first plurality of Lamb mode scans of the pipe sample with an electromagnetic acoustic transducer (EMAT) sensor occurs, wherein each Lamb mode scan of the first plurality of Lamb mode scans is measured along a length of the pipe sample in axial alignment with the pipe sample. Lamb waves can be defined as waves that are able to propagate through solid plates or spheres. The Lamb mode scans refer to the waves detected by the EMAT sensor of the Lamb waves propagating through the pipe sample.

The Lamb mode scans can be A scans or B scans. A-scans represent the waveform data for one pulse. Multiple material thickness readings can form B-scans which show trends in data recorded by the EMAT sensor. In an embodiment, processing the first plurality of Lamb mode scans by singular spectrum analysis occurs by applying a singular spectrum analysis (SSA) to the first plurality of Lamb mode scans to generate data from which the internal coating defects are identified in the pipe sample. The SSA can be defined as the decomposition of a time series into a sum of components. The name "singular spectrum analysis" relates to the spectrum of eigenvalues in a singular value decomposition of a covariance matrix, and not directly to a frequency domain decomposition. The data generated by the SSA comprises the characteristics of the pipe sample and natures of the defects within the pipe sample, such as pipe length, number of A-scans, number of B-scans, thickness of the pipe, and approximate area of the defect. The internal coating defects, for example, can be pipe cracks, corrosion of the pipe, stress-corrosion cracking, or weld defects. In an embodiment, the first plurality of Lamb mode scans are recorded at a frequency from dispersion curve of from 0.3 to 2 MHz, at a frequency of from 0.4 MHz to 2 MHz, preferably from 0.6 MHz to 1.8 MHz, preferably from 0.8 MHz to 1.6 MHz, preferably from 1 MHz to 1.4 MHz, or 1.2 MHz, a group velocity of from 1 mm/µs to 3 mm/µs, preferably from 1.5 mm/µs to 2.5 mm/µs, or 2 mm/µs, a phase velocity of from 5 mm/µs to 25 mm/µs, preferably from 10 mm/µs to 20 mm/µs, or 15 mm/µs, and a wave count of from 3 to 10, preferably between 4 and 9, preferably between 5 and 8, or 7. The frequency from dispersion curve can be defined as the amount of frequency between neighboring modes. It is important that the frequency from dispersion curve chosen for a particular mode should be such that it does not excite a neighboring mode significantly, thus avoiding interference of the wave bursts. Frequency can be defined as the number of Lamb waves that pass a fixed point per a unit time. Waves can be in a group and such groups are called wave packets, so the velocity with which a wave packet travels is called group velocity. The velocity with which the phase of a wave travels, not in a wave packet, is called phase velocity. The wave count can be defined as the amount of Lamb waves that added up in a given time period for a given wave burst.

In some embodiments, the method further comprises fixing the pipe sample based on the generated data from which the internal coating defects are identified in the pipe sample. For instance, the generated data includes characteristics of the pipe sample and natures of the defects within the pipe sample, such as pipe length, number of A-scans, number of B-scans, thickness of the pipe, and approximate area of the defect. Once this data is generated, the defects in the pipe sample can be located within the pipe sample. Once located, technicians can make the appropriate adjustments to the pipe in order to fix the defect, such as welding a crack, reinforcing the pipe sample with more material at the site of the defect or crack, or applying an epoxy/resin to repair the damage at the site of the defect. In some embodiments, the method further comprises marking the pipe sample into sections along the length of the pipe sample. As previously explained, the pipe sample 100 may be marked with B-scan positions, where the circumference of the pipe sample measured at the outer surface thereof may be divided into, for example, 40 sections along the length of the pipe sample. Each section is a circumferential section spaced 25 mm along the length of the pipe sample, as shown in FIG. 2. These circumferential sections are marked to better locate the exact location of the defect, rather than guessing where the defect may reside. By sectioning off the pipe sample, the repairs may be expedited as well, without the need for decommissioning the pipe in order to find the defect, crack, or site of damage. Therefore, the marking of the pipe sample into sections helps to identify the defect and repair the defect in a more efficient fashion.

EXAMPLES

Figure 3A:
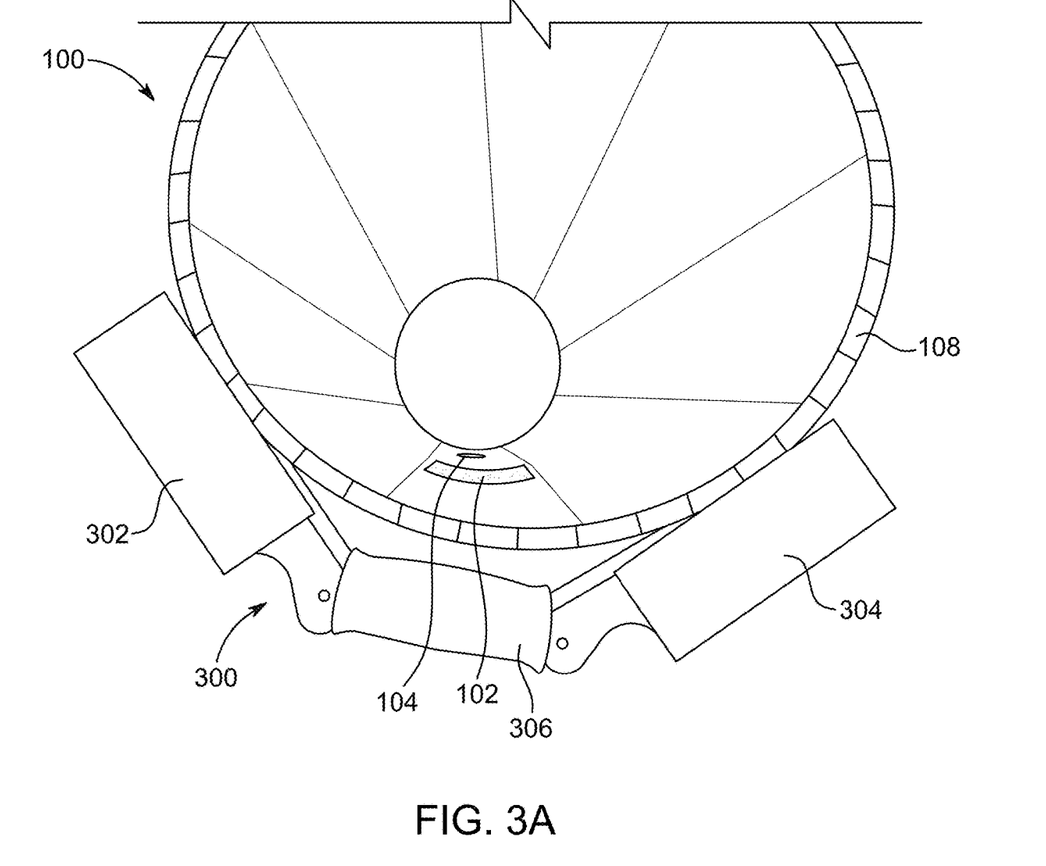
FIG. 3A illustrates an electromagnetic acoustics transducer (EMAT) sensor disposed on an outer surface of the pipe sample, according to an aspect of the present disclosure.
Figure 3B:
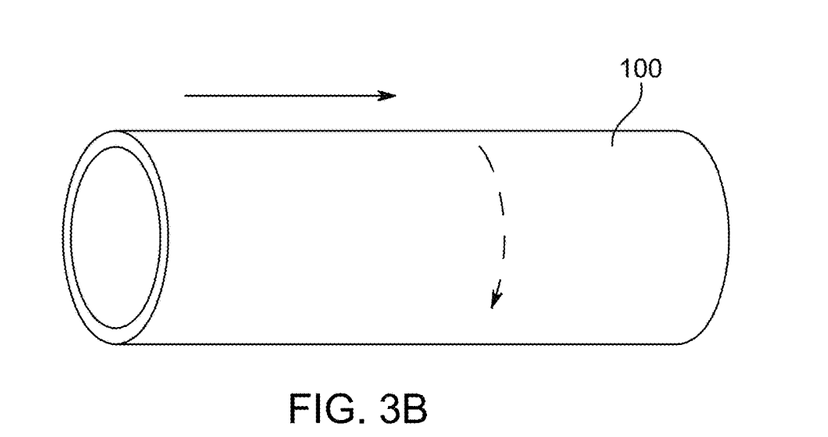
FIG. 3B illustrates a travel direction of a guided wave generated by the EMAT sensor, according to an aspect of the present disclosure.

FIG. 3A illustrates an electromagnetic acoustic transducer (EMAT) sensor 300 disposed on an outer periphery of the pipe sample 100 at the end 108 thereof. EMATs are prevalent in practice as they generate a variety of wave modes and are noncontact transducers which renders them applicable in high temperature and corroded surface applications. The EMAT sensor 300 includes a transmitter 302, a receiver 304, and a handle 306 extending between the transmitter 302 and the receiver 304. The pipe sample 100 was placed vertically such that the first patch 102 was scanned first. Due to the size of EMAT sensor 300 in an axial direction of the pipe sample 100, it was observed that a coil of the EMAT sensor 300 began to overlap first patch 102 after a travel of about 150 mm from the end 108 of the pipe sample 100. A total scan length was about 700 mm and an encoder of the EMAT sensor 300 was calibrated for 500 mm axial distance. The EMAT sensor 300 with an axial scan direction was chosen, so that the acoustic waves may travel in a circumferential direction of the pipe sample 100, as illustrated in FIG. 3B.

In order to obtain better resolution for defect detection with the EMAT sensor 300, short signals with high amplitude are desired. However, such configuration compromises signal-to-noise ratio (SNR), which is already low in the case of the EMAT sensor 300. On the other hand, long bursts with more cycles provide better mode selectivity and less interference. In addition to these factors, a frequency was chosen for a particular mode such that a neighboring mode is not excited significantly, thus avoiding interference of wave bursts. Based on these considerations and trade-offs, suitable parameters were selected after exhaustive trials and suitable coil. Examples of suitable coils include a wound coil, a meander coil (MC), a spiral coil, a double spiral coil, a double race-track coil, a butterfly coil, a spiral pancake coil, or the like. Further, sensor configurations were chosen for generating Lamb modes to collect B-scan data. Both symmetric and asymmetric modes were tested with dispersion curves shown in FIG. 4 and parameters listed in Table-1.

TABLE 1

Selected modes and corresponding parameters

| Mode | Frequency from dispersion curves [MHz] | Frequency [MHz] | Group velocity ($c_g$) [mm/μs] | Phase velocity ($c_p$) [mm/μs] | Voltage [Vpp] | Gain [dB] | Wave count |
|---|---|---|---|---|---|---|---|
| S0 | 0.242 | 0.242 | 3.19 | 2.61 | 600 | 20 | 4 |
| S1 | 0.362 | 0.433 | 4.78 | 5.69 | | | |
| A0 | 0.161 | 0.159 | 3.19 | 2.61 | | | |
| A1 | 0.340 | 0.433 | 2.3 | 5.06 | | | |

Figure 4:
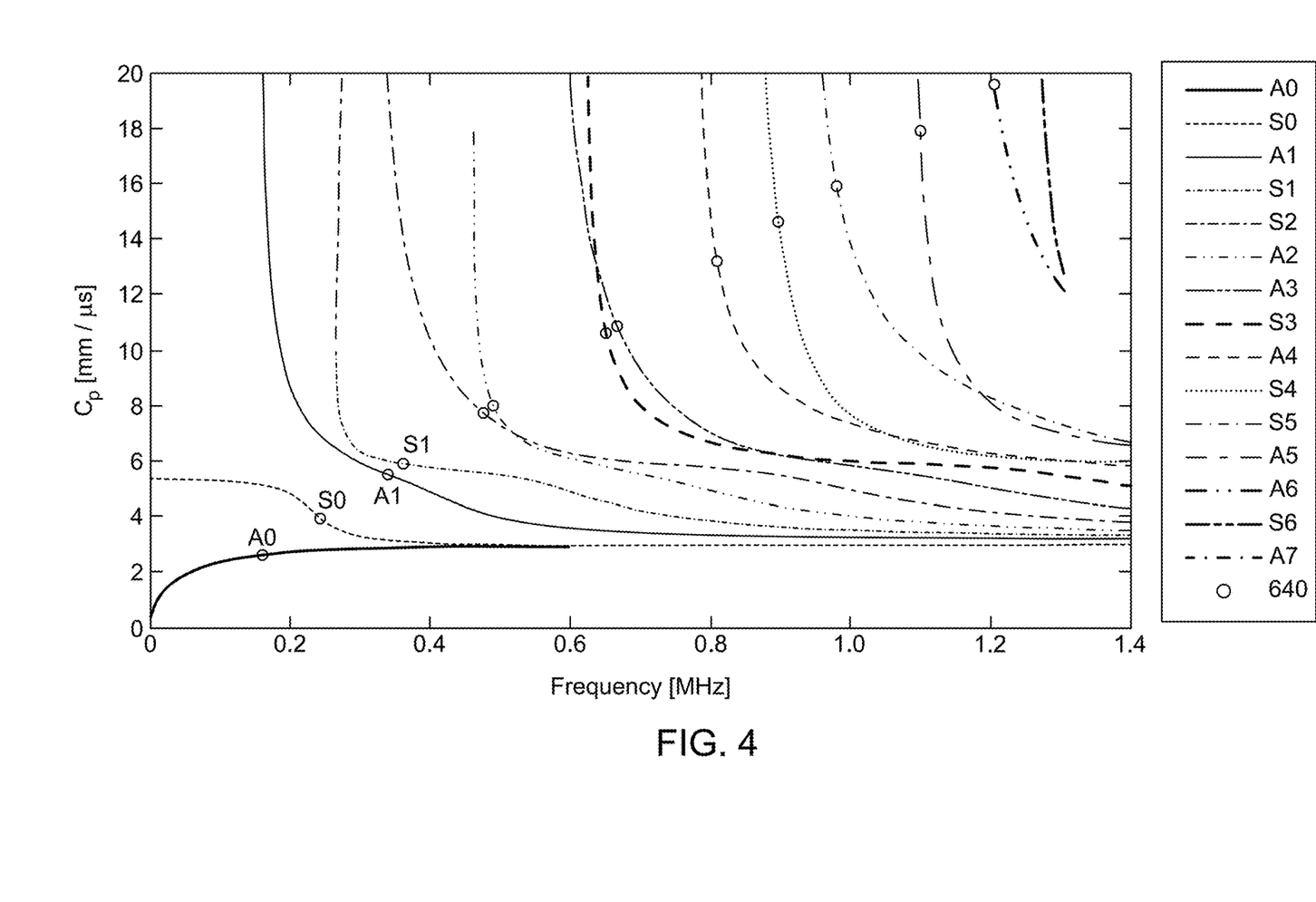
FIG. 4 illustrates a graph of Lamb modes dispersion curves plotted with frequency and phase velocity as parameters, according to an aspect of the present disclosure.

The curves in FIG. 4 were generated using accompanying software for the EMAT sensor 300. As seen from the Table-1, frequency used for generating S1/A1 modes was higher than that indicated by the dispersion curves (see Table-1). Such values of frequency ensured better separation of the modes, which was otherwise not possible as seen in FIG. 4.

Figure 5:
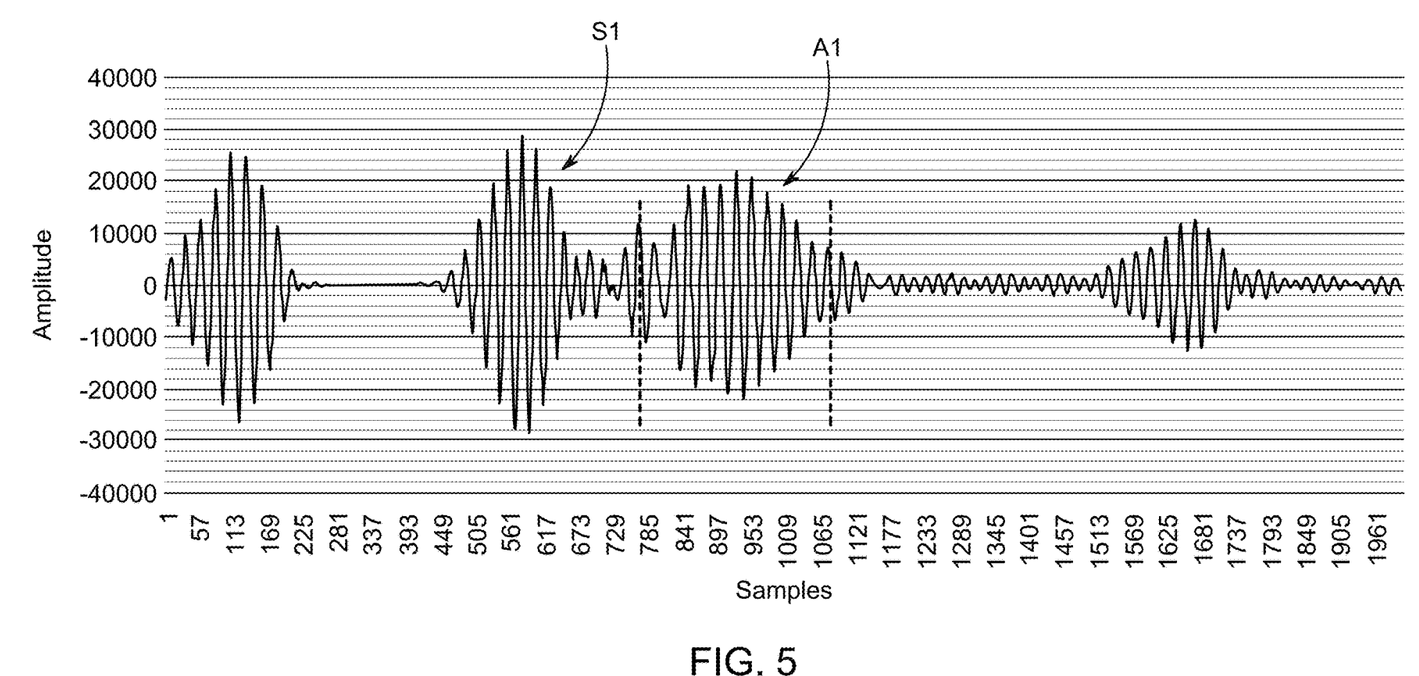
FIG. 5 shows an A-scan pertaining to S1/A1 mode, according to an aspect of the present disclosure.

The better separation of the modes from the higher frequency is beneficial in avoiding interference of the wave bursts, allowing for better scanning for better detection of the defects. While generating the S1 mode, an A1 mode wave packet was also observed and used for defect detection, as shown in FIG. 5, where a first wave packet corresponds to the S1 mode, and a second wave packet corresponds to the A1 mode. About 450 samples were required for the S1 mode, which conforms with the 250 mm distance between the transmitter 302 and the receiver 304 for a given $c_p$ in the Table-1 and a sampling frequency of 10 MHz.

Using the parameters listed in the Table-1, 41 B-scans were recorded for all four Lamb modes. These files were converted to Excel format and then combined to form a separate C-scan data file for each mode, which was then processed and analyzed for defect characterization.

Singular Spectrum Analysis (SSA) was used to extract the defect characterization from signal generated by the EMAT sensor 300. The SSA does not require any inputs about a model structure or statistical requirements from the generated signal, for processing. In addition, since the SSA is capable of decomposing a time series into trend, oscillatory components, and noise, the SSA was chosen for time-series analysis. The SSA can be used as a stand-alone tool or in combination with other algorithms to enhance results. N Golyandina, A Korobeynikov and A Zhigljavsky, Singular Spectrum Analysis with R. Berlin Heidelberg: Springer-Verlag; 2018, discloses aspects of the SSA and is herein incorporated by reference.

The SSA included multiple steps. Firstly, the signal is structured in a matrix form, called a trajectory matrix, where a number of rows equals a desired number of components in which the signal has to be decomposed. Each A-scan was decomposed into 10 components. Secondly, singular value decomposition (SVD) was applied to the trajectory matrix for decomposition, to produce component matrices. The component matrices (product of eigenvectors and respective singular values) thus obtained were then combined to group related, similar, or predetermined periodicities or patterns in the signal. Grouping the related components refers to focusing on particular characteristics of the signal which would enhance a specific periodicity. Further, singular component's time series was reconstructed from the obtained matrix.

A pre-processing step for the SSA included signal selection (as shown in FIG. 5), normalization, and removal of average. Aspects of the pre-processing step is also discussed in N Golyandina, A Korobeynikov and A Zhigljavsky, Singular Spectrum Analysis with R. Berlin Heidelberg: Springer-Verlag; 2018. The SSA was then executed on every A-scan's selected window to compute the components, which were individually analyzed to determine anomalies relevant to defects (such as the first patch 102, the second patch 104, and the third patch 106) in the pipe sample 100. The components with unique features were selected for the defect characterization. Since such analysis was applied for the first time on internal coating defect data, the technique was based on manual visualization and judgment of each component.

In an aspect, the EMAT sensor 300 may be communicably coupled to a controller (not shown) to perform the SSA. In a non-limiting example, the controller may be implemented using hardware, software, firmware, or a combination thereof. In some examples, the controller may be implemented within a computer system capable of analyzing the signals and displaying values based on the analysis. The computer system, for example, may include one or more computers. When more than one computer is implemented, those computers may be in communication with each other through a communications medium, such as a network, as known to a person skilled in the art.

When software is used, the operations performed by the controller may be implemented using, for example, without limitation, a program code configured to run on a processor unit. When firmware is used, the operations performed by the controller may be implemented using, for example, without limitation, a program code and data and stored in persistent memory to run on a processor unit. When hardware is employed, the hardware may include one or more circuits that operate to perform the operations performed by the controller. Depending on the implementation, the hardware may take the form of a circuit system, an integrated circuit, an application specific integrated circuit (ASIC), a programmable logic device, or some other suitable type of hardware device configured to perform any number of operations, such as the analysis of the signals.

In order to visualize the anomalies on entire C-scan, a parameter based on energy was defined and calculated which resulted in a single number representing each A-scan's data, thus allowing to plot a color map for the entire pipe sample 100 for defect visualization. To calculate the parameter;

- each A-scan was represented as $\bar{x}[t]=[x_1, x_2, \ldots, x_L]$, where L was a total number of samples in a selected window of an A-scan;
- B-scan was represented as $\bar{y}[X]=[\bar{x}_1, \bar{x}_2, \ldots, \bar{x}_M]^T$, where M represented the number of A-scans in a B-scan; and
- C-scan was represented as $\bar{z}[Y]=[\bar{y}_1, \bar{y}_2, \ldots, \bar{y}_N]$, where N represented a total number of B-scans.

The energy for each A-scan was then calculated as: $E[\bar{x}]=\Sigma_{i=1}^{L} \bar{x}[i]^2/L$ This value was inserted in an [N×M] grid to represent the C-scan. For a comparison between $E[\bar{x}]$ for all A-scans, following step was performed before plotting the color map $$E[\bar{z}]=(E[\bar{x}]|_{N \times M}/\max_{N \times M} E[\bar{x}])^p$$

where p≥1 was chosen to mitigate noise and further enhance an amplitude in regions of interest.

Python 3.7.4 64-bit was used for implementation, which took significant time for execution. This was due to a large amount of data obtained for the 1 m pipe sample 100 (L=200, M=725, N=41), grouping, and diagonal averaging. In order to efficiently execute the above described steps, algorithmic changes were made in Python code for fast diagonal averaging, thus reducing a processing time to a few seconds.

Results

As described earlier, the scans were done in an axial direction of the pipe sample 100 such that EMAT sensor 300 may travel from one end (such as the end 108) of the pipe sample 100 to the other end, making a length of the B-scan about 700 mm. There were a total of 41 such B-scans, each scan about 25 mm apart in the circumferential direction of the pipe sample 100. Due to a pitch-catch configuration, the transmitter 302 and the receiver 304 overlapped the defects for some scans. For other scans, the defects were either in a short path (short distance between the transmitter 302 and the receiver 304) or in a long path. In the pitch-catch configuration, or the pitch-catch method, one channel functioning as the transmitter emits shear-wave pulse (or, signal) along the circumference of the pipe sample 100 and another channel sequentially functioning as the receiver picks up direct and reflected pulse. In ultrasonic pitch-catch method, travel time from the transmitter to the receiver and amplitude of pulses reflected are measured.

Both symmetric and asymmetric Lamb modes S0, S1, A0, and A1 were tested with the parameters given in Table-1. However, it was observed that no defect information was extracted from the symmetric modes, even after trials with various combinations of experimental and algorithmic parameters. In contrast, it was observed that, the defect information and, hence the detection, was available with the asymmetric modes. A flexural nature of asymmetric modes implied that out-of-plane particle motion was more dominant, thus allowing maximum contact between the pipe sample 100 surface vibration and the internal coating.

The B-scans were analyzed individually, as well as altogether as a C-scan. FIG. 6 shows a second SSA component of A0 B-scan and combined first and second components of A1 B-scan. These B-scans were taken with the defects midway between the transmitter 302 and the receiver 304. From FIG. 6, the first patch 102 (that is, 100×100 mm² defect) may be detected in the case of A0 mode with a precise characterization of location and size due to a significant increase in the amplitude. As mentioned earlier, the first patch 102 is located at a distance of about 230 mm from an end 108 of the pipe sample 100. The A0 mode in FIG. 6 detected the location as 210 mm.

Similarly, detected axial size was 120 mm, whereas the actual size was 100 mm. It was understood that such difference between the actual and the detected value is due to the physical size of the EMAT sensor 300 which overlaps at a region of defect before the EMAT sensor's center reaches the region of defect during the travel in the axial direction. In the case of A1 mode, the first patch 102 is visible and the location may also be characterized in terms of reduction in arrival time of extrema points, followed by an increase in amplitude along the axial direction. However, it was observed that precise size was not obtained in the A1 mode as compared to the A0 mode. Specifically, axial size was roughly 150 mm, and the detected location was 180 mm. Such result may be understood as a higher sensitivity of the A1 mode compared with the A0 mode, which causes even a slight overlap of the EMAT sensor 300 over the defect to have a significant effect. Such characteristics were not observed with smaller defects in any of the SSA components.

Figure 7:
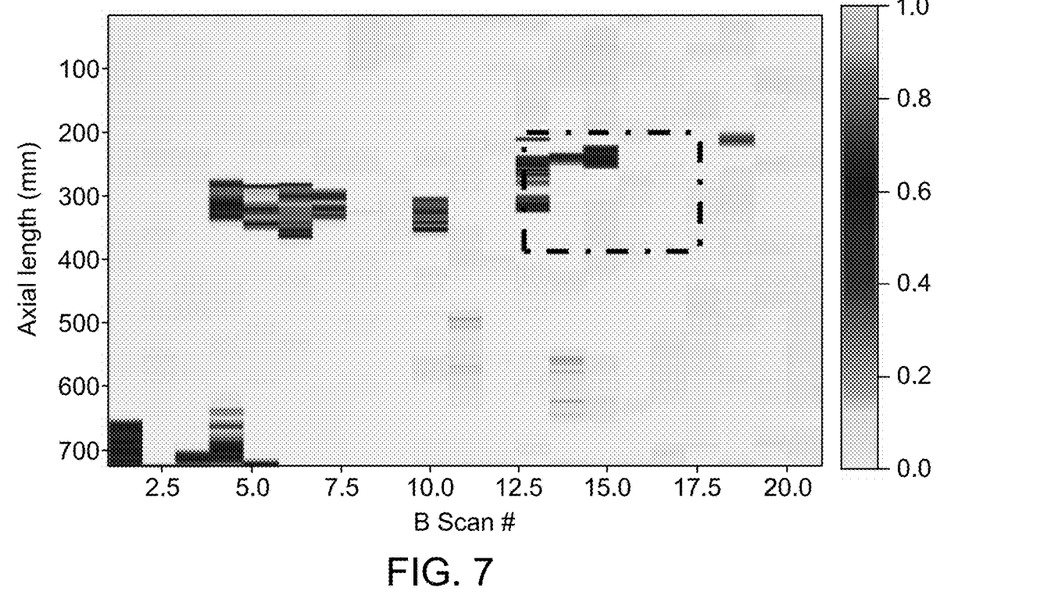
FIG. 7 is a 2D graph depicting a C-scan pertaining to energy parameter for the A0 mode, according to an aspect of the present disclosure.

FIG. 7 shows a two dimensional (2D) graphs of the second SSA component for the C-scan of the A0 mode. The 2D graphs indicate a capability to detect shape and orientation of the defect. The position and axial size of the defect (only in B-scan) was correctly identified in the 2D graph. Two patches which may be observed in FIG. 7 correspond to the overlap of the transmitter 302 and the receiver 304 with the defects in respective B scans. The second patch 104 marked with a dotted box in FIG. 7 shows an actual location, size, and shape of the defect.

Figure 8:
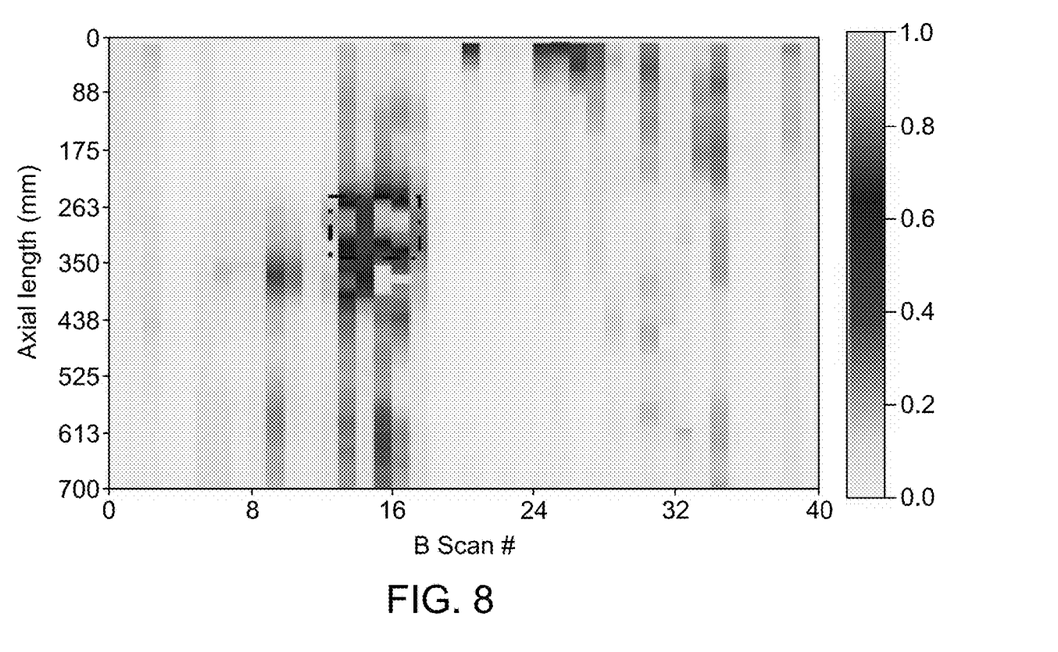
FIG. 8 is a 2D graph depicting a C-scan pertaining to energy parameter for the A1 mode, according to an aspect of the present disclosure.

FIG. 8 shows a 2D graph for the C-scan of the A1 mode. Particularly, the 2D graph of FIG. 8 shows better results as compared to the 2D graph of FIG. 7 for A0 mode. A single patch is observed in FIG. 8 with an axial and circumferential size of roughly 150 mm and 100 mm, respectively, in conformance with the respective B-scan in FIG. 6. The detected location was precise with a start of the defect at around 200 mm of axial length. These results showed that best results for the pipe sample 100 and coating type considered can be obtained using the A1 mode, which provides the precise location, shape information, and an acceptable size of the defect. According to an aspect, a value of each pixel in the C-scan may be representative of locations of the defect.

Figure 9:
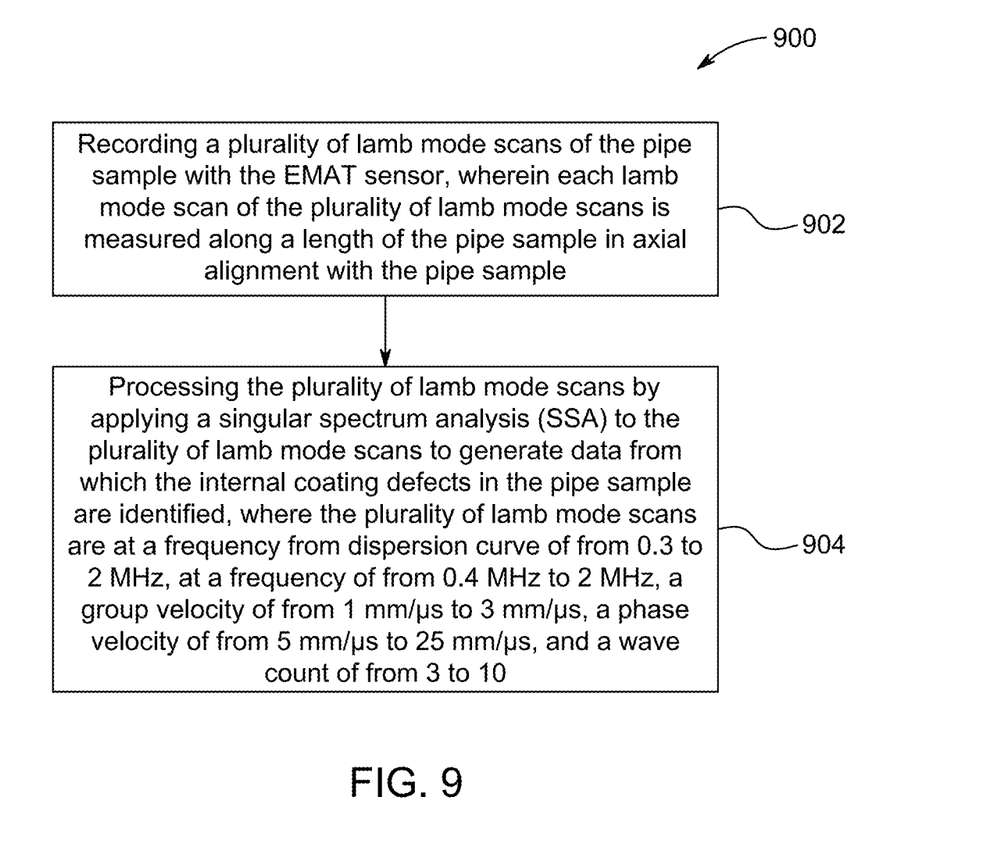
FIG. 9 is a flowchart of a method for detecting internal coating defects in the pipe sample with the EMAT sensor, according to an aspect of the present disclosure.

FIG. 9 illustrates a flowchart of a method 900 for detecting internal coating defects in the pipe sample 100 with the EMAT sensor 300. The method 900 is described in conjunction with FIG. 1 through FIG. 8. According to an aspect of the present disclosure, the method 900, at step 902, includes recording a plurality of Lamb mode scans of the pipe sample 100 with the EMAT sensor 300, where each Lamb mode scan of the plurality of Lamb mode scans is measured along the length of the pipe sample 100 in the axial alignment with the pipe sample 100. In an aspect, at least 40 Lamb mode scans are recorded axially along the length of the pipe sample 100. In some aspects, the recording the plurality of Lamb mode scans may occur from 60% to 80% of the length of the pipe sample 100. The plurality of Lamb mode scans includes A-scans and B-scans. In some aspects, the method 900 further includes combining the A-scans and the B-scans to generate C-scan data to analyze defect information.

At step 904, the method 900 includes processing the plurality of Lamb mode scans by applying the singular spectrum analysis (SSA) to the plurality of Lamb mode scans to generate data from which the internal coating defects in the pipe sample 100 are identified. The plurality of Lamb mode scans are at a frequency from dispersion curve of from 0.3 to 2 MHz, at a frequency of from 0.4 MHz to 2 MHz, a group velocity of from 1 mm/µs to 3 mm/µs, a phase velocity of from 5 mm/µs to 25 mm/µs, and a wave count of from 3 to 10.

In some aspects, a second plurality of Lamb scans may be recorded with a frequency from dispersion curve of from 0.15 to 1.5 MHz, at a frequency of from 0.1 MHz to 1.5 MHz, a group velocity of from 3 mm/µs to 5 mm/µs, a phase velocity of from 2.5 mm/µs to 15 mm/µs, and a wave count of from 3 to 10. Further, a third plurality of Lamb scans may be recorded with a frequency from dispersion curve of from 0.35 to 2.25 MHz, at a frequency of from 0.4 MHz to 2 MHz, a group velocity of from 4.5 mm/µs to 7 mm/µs, a phase velocity of from 5.5 mm/µs to 15 mm/µs, and a wave count of from 3 to 10. Furthermore, a fourth plurality of Lamb scans may be recorded with a frequency from dispersion curve of from 0.2 to 1.5 MHz, at a frequency of from 0.2 MHz to 1.5 MHz, a group velocity of from 3 mm/µs to 5 mm/µs, a phase velocity of from 2.5 mm/µs to 15 mm/µs, and a wave count of from 3 to 10.

According to an aspect, the SSA includes steps of structuring a signal into a trajectory matrix, where a number of rows equals a predetermined number of components in which the signal is decomposed; applying singular value decomposition (SVD) to the trajectory matrix for decomposition to produce component matrices; combining the component matrices, which are a product of eigenvectors and respective singular values, to group related, similar, or predetermined periodicities or patterns in the signal; and reconstructing a singular component's time series from an individual component matrix.

In some aspects, the SSA may further include steps of defining an energy parameter A as a function of a total number of A-scan samples, an energy parameter B as a function of a total number of A-scans in each B-scan, and an energy parameter C as a function of a total number of B-scans taken. Further, an energy value for each A-scan, defined as a function of the energy parameter A, the energy parameter B, and the energy parameter C may be calculated. In an aspect, a contour map for an entire circumference of the pipe sample 100 as a function of the energy value may be plotted.

To this end, it will be understood that the pipe sample 100 was scanned from the outside, and collected data were analyzed using the SSA. The analysis of the B scans and C-scans show a possibility of detecting the size and position of only the largest defect (the first patch 102) with the asymmetric modes A0 and A1, whereby the A1 mode shows substantially better results in terms of the defect characterization. Moreover, the results were repeatable over several scans, thus showing effectiveness of the adopted methodology.

As used herein, the terms "a" and "an" and the like carry the meaning of "one or more."

Numerous modifications and variations of the present invention are possible in light of the above teachings. It is, therefore, to be understood that, within the scope of the appended claims, the invention may be practiced otherwise than as specifically described herein.

The invention claimed is:

1. A method for detecting internal coating defects in a pipe sample, comprising:
   recording a first plurality of Lamb mode scans of the pipe sample with an electromagnetic acoustic transducer (EMAT) sensor, wherein each Lamb mode scan of the first plurality of Lamb mode scans is measured along a length of the pipe sample in axial alignment with the pipe sample;
   processing the first plurality of Lamb mode scans by singular spectrum analysis by applying a singular spectrum analysis (SSA) to the first plurality of Lamb mode scans to generate data from which the internal coating defects are identified in the pipe sample;
   wherein the first plurality of Lamb mode scans are recorded at a frequency from dispersion curve of from 0.3 to 2 MHz, at a frequency of from 0.4 MHz to 2 MHz, a group velocity of from 1 mm/µs to 3 mm/µs, a phase velocity of from 5 mm/µs to 25 mm/µs, and a wave count of from 3 to 10.

2. The method of claim 1, wherein the method further comprises:
   helically wrapping an internal surface of the pipe sample with a butyl tape-wrap, such that edges of the butyl tape-wrap touch and cover the entire internal surface of the pipe sample; and
   adhering the butyl tape-wrap to the pipe sample with an adhesive.

3. The method of claim 1, wherein at least 40 Lamb mode scans are recorded axially along a length of the pipe sample.

4. The method of claim 1, wherein the recording includes recording A-scans and B-scans.

5. The method of claim 1, further comprising
recording a second plurality of Lamb scans with a frequency from dispersion curve of from 0.15 to 1.5 MHz, at a frequency of from 0.1 MHz to 1.5 MHz, a group velocity of from 3 mm/μs to 5 mm/μs, a phase velocity of from 2.5 mm/μs to 15 mm/μs, and a wave count of from 3 to 10.

6. The method of claim 1, further comprising
recording a third plurality of Lamb scans with a frequency from dispersion curve of from 0.35 to 2.25 MHz, at a frequency of from 0.4 MHz to 2 MHz, a group velocity of from 4.5 mm/μs to 7 mm/μs, a phase velocity of from 5.5 mm/μs to 15 mm/μs, and a wave count of from 3 to 10.

7. The method of claim 1, further comprising
recording a fourth plurality of Lamb scans with a frequency from dispersion curve of from 0.2 to 1.5 MHz, at a frequency of from 0.2 MHz to 1.5 MHz, a group velocity of from 3 mm/μs to 5 mm/μs, a phase velocity of from 2.5 mm/μs to 15 mm/μs, and a wave count of from 3 to 10.

8. The method of claim 1, wherein the recording the first plurality of Lamb mode scans occurs from 60% to 80% of an axial length of the pipe sample.

9. The method of claim 4, further comprising
combining the A-scans and B-scans to generate C-scan data to analyze defect information.

10. The method of claim 1, wherein the singular spectrum analysis (SSA) comprises:
structuring a signal into a trajectory matrix, wherein a number of rows of the trajectory matrix equals a predetermined number of components in which the signal is decomposed;
applying singular value decomposition (SVD) to the trajectory matrix for decomposition to produce component matrices;
combining the component matrices, which are a product of eigenvectors and respective singular values, to group related, similar, or predetermined periodicities or patterns in the signal;
reconstructing a singular component's time series from an individual component matrix; and
carrying out the SSA on the pipe sample.

11. The method of claim 10, further comprising
defining an energy parameter, A as a function of a total count of A-scan samples.

12. The method of claim 11, further comprising
defining an energy parameter B as a function of a total count of A-scans in each B-scan.

13. The method of claim 12, further comprising
defining an energy parameter C as a function of a total count of B-scans taken.

14. The method of claim 13, further comprising
calculating an energy value for each A-scan, defined as a function of the energy parameter A, the energy parameter B, and the energy parameter C.

15. The method of claim 14, further comprising
plotting a contour map for an entire circumference of the pipe sample as a function of the energy value.

16. The method of claim 15, wherein the pipe sample is patched based on defects identified by the contour map.

17. The method of claim 15, wherein the defects of the pipe sample are marked based on defects identified by the contour map.

18. The method of claim 1, wherein the method further comprises fixing the pipe sample based on the generated data from which the internal coating defects are identified in the pipe sample.

19. The method of claim 1, wherein the method further comprises marking the pipe sample into sections along the length of the pipe sample.

20. The method of claim 1, wherein the method further comprises selecting a frequency at a particular mode such that a neighboring mode is not excited, thus avoiding interference of wave bursts.

* * * * *